United States Patent [19]

Ishibashi et al.

[11] 4,118,238
[45] Oct. 3, 1978

[54] OPTICAL GLASS

[75] Inventors: Kazufumi Ishibashi, Sagamihara; Shizuo Matsumaru, Yokohama; Takeo Ichimura, Tokyo, all of Japan

[73] Assignee: Nippon Kogaku K.K., Tokyo, Japan

[21] Appl. No.: 707,649

[22] Filed: Jul. 22, 1976

[30] Foreign Application Priority Data

Jul. 28, 1975 [JP] Japan .................. 50-91161

[51] Int. Cl.$^2$ .............................................. C03C 3/14
[52] U.S. Cl. .................................................. 106/47 Q
[58] Field of Search ...................................... 106/47 Q

[56] References Cited

U.S. PATENT DOCUMENTS

| | | | |
|---|---|---|---|
| 2,456,033 | 12/1948 | Sun .................. | 106/47 Q |
| 2,678,281 | 5/1954 | Geffcken et al. .................. | 106/47 Q |
| 2,861,000 | 11/1958 | Geffcken et al. .................. | 106/47 Q |
| 2,866,712 | 12/1958 | Weissenberg et al. .......... | 106/47 Q |
| 3,081,178 | 3/1963 | Weissenberg et al. .......... | 106/47 Q |
| 3,082,101 | 3/1973 | Geffcken et al. .................. | 106/47 Q |
| 3,150,990 | 7/1964 | Faulstich .......................... | 106/47 Q |
| 3,615,762 | 10/1971 | Parry et al. ...................... | 106/47 Q |
| 3,650,780 | 3/1972 | Connelly .......................... | 106/47 Q |
| 3,669,696 | 6/1972 | Suzuki et al. ................... | 106/47 Q |
| 3,672,920 | 6/1972 | Ishiguri .......................... | 106/47 Q |

Primary Examiner—O. R. Vertiz
Assistant Examiner—Mark Bell
Attorney, Agent, or Firm—Shapiro and Shapiro

[57] ABSTRACT

In thorium-free optical glass containing oxygen ions and fluorine ions as anions, cations in the glass calculated as oxides are in the following ranges of percentage by weight:

| | |
|---|---|
| $B_2O_3$ | 10–44, |
| $La_2O_3$ | 30–66, |
| $Y_2O_3$ | 4–31, |
| $ZrO_2$ | 0–11, |
| $Ta_2O_5$ | 0–21, |
| $Gd_2O_3$ | 0–12, |
| $Nb_2O_5$ | 0–19, |
| RO | 0–9, |
| PbO | 0–10, |
| $TiO_2$ | 0–8, and |
| $GeO_2$ | 0–26, | where RO is an ingredient or a combination of two or more ingredients of MgO, CaO, SrO, BaO and ZnO, and part of the oxygen ions is substituted for 0.2 to 10% by weight of fluorine ions relative to the glass. The thorium-free optical glass has a refractive index of 1.71 to 1.85 and Abbe number of 40 to 57.

5 Claims, No Drawings

OPTICAL GLASS

BACKGROUND OF THE INVENTION

1. Field of the Invention

This invention relates to optical glass of high refractive index and los dispersion, and more particularly to optical glass having a refractive index nd in the range of 1.71 to 1.85 and Abbe number vd ranging from 40 to 57.

2. Description of the Prior Art

Optical glass of high refractive index and low dispersion has heretofore been made to contain thorium oxide for imparting the properties of high refractive index and low dispersion. However, the use of thorium oxide as an ingredient is undesirable because thorium is radioactive and harmful to the human body.

Instead of thorium oxide, it has been proposed to use yttrium oxide for imparting the properties of high refractive index and low dispersion to glass. For example, glass constituting a three-ingredient system $B_2O_3$-$La_2O_3$-$Y_2O_3$ exhibits a high refractive index and low dispersion. However, the use of these three ingredients alone suffers from a very strong tendency to devitrify, and accordingly, the glass forming region is narrow, thus making it impossible to obtain a stable optical glass having the desired optical constants. An ingredient such as $Ta_2O_5$, $ZrO_2$ or CdO which imparts a high refractive index may be added to the three-ingredient system $B_2O_3$-$La_2O_3$-$Y_2O_3$, but if the content of such additional ingredient exceeds 5%, the Abbe number will be decreased, and therefore, the amount of such ingredient must be restricted to a very small percentage, and as a result, glass having a wide range of refractive index cannot be obtained.

SUMMARY OF THE INVENTION

According to the present invention, optical glass of high refractive index and low dispersion is provided which basically consists of a four-ingredient system $B_2O_3$-$La_2O_3$-$Y_2O_3$-F, and which is devoid of thorium, but which has a refractive index nd in the range of 1.71 to 1.85 and Abbe number vd ranging from 40 to 57.

The fluorine containing four-ingredient system of the invention contains fluorine in the range of 0.2 to 10% by weight. It has the advantage over the three-ingredient system $B_2O_3$-$La_2O_3$-$Y_2O_3$ in that it provides a very low liquidus temperature. In the glass of the invention, the tendency to devitrify is remarkably reduced, and this results in a glass which is stable and easily produced. In the glass composition of the invention, the glass forming region is greatly expanded, and accordingly, the range of the refractive index is widely expanded. More specifically, as compared with the three-ingredient system $B_2O_3$-$La_2O_3$-$Y_2O_3$ which can only provide a refractive index in the range of 1.727 to 1.751, the composition of the invention enables the manufacture of a stable glass having a refractive index ranging from 1.713 to 1.758.

Although the $B_2O_3$-$La_2O_3$-$Y_2O_3$-F system as a four-ingredient system has a wide glass forming region, the present invention also permits forming an optical glass by further adding thereto a substantial amount of an ingredient such as $Ta_2O_5$, $ZrO_2$, $Gd_2O_3$, $Nb_2O_5$, RO (RO being an ingredient or a combination of two or more ingredients of MgO, CaO, SrO, BaO and ZnO), PbO, $TiO_2$ or $GeO_2$ which enhances the refractive index without appreciable reduction of the Abbe number. Some optical glass containing these ingredients has a refractive index as high as 1.848. For a refractive index in the vicinity of 1.85, a conventional system comprising oxides alone has resulted in unstable glass. The fluorine containing system of the invention enables the production of a stable glass. Due to the fluorine contained therein, the composition of the invention has a remarkably low tendency to devitrify, and accordingly, a wide glass forming region is provided, and the inclusion of an ingredient for enhancing the refractive index is permitted.

Optical glass made according to the invention not only has a high refractive index and low dispersion but also has excellent properties from the standpoint of transmission factor, chemical durability, machinability, etc.

DESCRIPTION OF THE PREFERRED EMBODIMENTS

The composition of glass made according to the invention will now be shown for five (5) composition ranges. It should be understood that the indicated percentages of the oxides are the values obtained by calculating the positive ions contained in the glass as the oxides, and in the actual glass, the oxygen ions amoung these positive ions are substituted for fluorine ions of the following percentages by weight.

| First Composition Range | |
| --- | --- |
| $B_2O_3$ | 10 – 44% by weight |
| $La_2O_3$ | 30 – 66 |
| $Y_2O_3$ | 4 – 31 |
| $ZrO_2$ | 0 – 11 |
| $Ta_2O_5$ | 0 – 21 |
| $Gd_2O_3$ | 0 – 12 |
| $Nb_2O_5$ | 0 – 19 |
| RO | 0 – 9 |
| PbO | 0 – 10 |
| $TiO_2$ | 0 – 8 |
| $GeO_2$ | 0 – 26 |
| F | 0.2 – 10 |

(RO is an ingredient or a combination of two or more ingredients of MgO, CaO, SrO, BaO and ZnO)

$B_2O_3$ will cause devitrification when it is less than 10%, and will separate into two liquids when it exceeds 44%. $La_2O_3$ increases dispersion when it is less than 30%, and will cause devitrification when it exceeds 66%. $Y_2O_3$ will cause devitrification when it is less than 4% and when it exceeds 31%. $ZrO_2$, $Ta_2O_5$, $Gd_2O_3$, $Nb_2O_5$, RO, PbO, $TiO_2$ and $GeO_2$ will cause devitrification when they exceed 11%, 21%, 12%, 19%, 9%, 10%, 8% and 26%, respectively. Fluorine will cause devitrification when it is less than 0.2%, and homogeneous glass cannot be obtained when it exceeds 10%.

A glass which is more stable against devitrification than the glass of the first composition range has a composition as follows:

| Second Composition Range | |
| --- | --- |
| $B_2O_3$ | 10 – 44% by weight |
| $La_2O_3$ | 30 – 66 |
| $Y_2O_3$ | 4 – 31 |
| $ZrO_2$ | 1 – 11 |
| $Ta_2O_5$ | 1 – 21 |
| RO | 0 – 9 |
| $GeO_2$ | 0 – 26 |
| F | 0.2 – 10 |

A glass of further improved stability against devitrification has a composition as follows:

| Third Composition Range | |
| --- | --- |
| $B_2O_3$ | 12 – 34% by weight |
| $La_2O_3$ | 40 – 48 |
| $Y_2O_3$ | 8 – 12 |
| $ZrO_2$ | 1 – 9 |
| $Ta_2O_5$ | 3 – 14 |
| RO | 0 – 4 |
| $GeO_2$ | 0 – 23 |
| F | 0.2 – 1.5 |

A glass having improved stability against devitrification and which has optical constants in the ranges of refractive index $nd = 1.76$–$1.79$ and Abbe number $vd = 47$–$50$ has a composition as follows:

| Fourth Composition Range | |
| --- | --- |
| $B_2O_3$ | 29 – 34% by weight |
| $La_2O_3$ | 40 – 45 |
| $Y_2O_3$ | 8 – 12 |
| $ZrO_2$ | 4 – 9 |
| $Ta_2O_5$ | 3 – 10 |
| RO | 1 – 4 |
| F | 0.4 – 0.7 |

A glass having improved stability against devitrification and which has optical constants in the ranges: refractive index $nd = 1.80$–$1.84$ and Abbe number $vd = 43$–$47$ has a composition as follows:

| Fifth Composition Range | |
| --- | --- |
| $B_2O_3$ | 12 – 26% by weight |
| $La_2O_3$ | 41 – 48 |
| $Y_2O_3$ | 8 – 11 |
| $ZrO_2$ | 1 – 8 |
| $Ta_2O_5$ | 6 – 14 |
| $GeO_2$ | 6 – 23 |
| F | 0.6 – 1.5 |

Optical glass according to the present invention may be produced by using oxides, carbonates, nitrates or fluorides as the material for each ingredient, weighing these materials into a desired ratio, and sufficiently mixing them to form the compound, placing the compound in a platinum crucible within an electric furnace heated to from 1200° to 1350° C. to melt and refine the material, thereafter agitating the material for homogenization, and then casting the same into a mold. The fluorine material may be a fluoride having cations, and the types of the cations may be freely chosen in accordance with the types of the glass. Lanthanum fluoride or yttrium fluoride are preferred.

Various examples of the optical glass according to the present invention are shown below with respect to the compositions (analysed values — percentages by weight of the oxides obtained when the positive ions in the glass are calculated as the oxide, and percentage by weight of fluorine relative to the glass), refractive index $nd$, and Abbe number $vd$.

| Composition | Examples | | | | | | | |
| --- | --- | --- | --- | --- | --- | --- | --- | --- |
| | 1 | 2 | 3 | 4 | 5 | 6 | 7 | 8 |
| $B_2O_3$ | 41.59 | 37.39 | 32.79 | 38.93 | 37.76 | 31.05 | 26.63 | 27.29 |
| $La_2O_3$ | 45.61 | 48.75 | 59.03 | 52.05 | 33.98 | 60.56 | 56.09 | 63.86 |
| $Y_2O_3$ | 12.80 | 13.86 | 8.18 | 9.02 | 28.26 | 8.39 | 17.28 | 8.85 |
| F | 1.2 | 1.0 | 2.3 | 2.2 | 2.8 | 3.2 | 7.4 | 7.9 |
| nd | 1.7245 | 1.7356 | 1.7576 | 1.7235 | 1.7131 | 1.7525 | 1.7353 | 1.7435 |
| $\gamma d$ | 55.1 | 54.6 | 53.3 | 55.6 | 56.1 | 54.1 | 55.7 | 55.0 |
| | 9 | 10 | 11 | 12 | 13 | 14 | 15 | 16 |
| $B_2O_3$ | 31.36 | 33.46 | 34.31 | 16.28 | 12.01 | 13.30 | 12.77 | 18.82 |
| $La_2O_3$ | 47.16 | 50.33 | 51.62 | 50.96 | 32.13 | 46.70 | 42.01 | 43.84 |
| $Y_2O_3$ | 7.26 | 7.75 | 7.95 | 12.26 | 8.49 | 9.95 | 9.81 | 9.74 |
| $ZrO_2$ | — | 8.46 | — | — | 6.26 | 2.11 | — | 4.19 |
| $Ta_2O_5$ | 14.22 | — | — | — | 7.95 | 12.75 | 19.00 | 10.83 |
| $Gd_2O_3$ | — | — | — | — | 9.41 | — | — | — |
| MgO | — | — | 0.57 | — | — | — | — | — |
| CaO | — | — | 0.79 | — | — | — | — | — |
| SrO | — | — | 1.46 | — | — | — | — | — |
| BaO | — | — | 2.16 | — | — | — | — | — |
| ZnO | — | — | 1.15 | — | — | — | — | — |
| $GeO_2$ | — | — | — | 20.50 | 23.76 | 15.19 | 16.41 | 12.58 |
| F | 0.86 | 0.93 | 0.97 | 1.3 | 0.80 | 1.5 | 0.62 | 0.88 |
| nd | 1.7723 | 1.7712 | 1.7423 | 1.8015 | 1.8399 | 1.8356 | 1.8477 | 1.8207 |
| $\gamma d$ | 48.7 | 50.9 | 54.0 | 47.5 | 42.6 | 43.5 | 41.8 | 44.6 |
| | 17 | 18 | 19 | 20 | 21 | 22 | 23 | |
| $B_2O_3$ | 14.32 | 24.97 | 32.79 | 30.79 | 30.48 | 34.48 | 33.73 | |
| $La_2O_3$ | 42.85 | 43.47 | 43.54 | 41.91 | 45.84 | 51.88 | 50.74 | |
| $Y_2O_3$ | 9.97 | 9.07 | 10.97 | 9.37 | 7.06 | 7.99 | 7.81 | |
| $ZrO_2$ | 3.07 | 6.71 | 5.96 | 7.37 | — | — | — | |
| $Ta_2O_5$ | 7.97 | 8.51 | 4.31 | 8.79 | — | — | — | |
| $Nb_2O_5$ | — | — | — | — | 16.62 | — | — | |
| BaO | — | — | 1.19 | 0.86 | — | — | — | |
| ZnO | — | — | 1.25 | 0.91 | — | — | — | |
| PbO | — | — | — | — | — | — | 7.72 | |
| $TiO_2$ | — | — | — | — | — | 5.65 | — | |
| $GeO_2$ | 21.80 | 7.27 | — | — | — | — | — | |
| F | 0.62 | 0.67 | 0.40 | 0.26 | 0.84 | 0.96 | 0.94 | |
| nd | 1.8267 | 1.8024 | 1.7682 | 1.7837 | 1.8143 | 1.7719 | 1.7626 | |
| $\gamma d$ | 43.9 | 46.4 | 49.9 | 47.7 | 40.3 | 46.3 | 49.4 | |
| | 24 | 25 | 26 | | | | | |
| $B_2O_3$ | 32.57 | 30.64 | 13.84 | | | | | |
| $La_2O_3$ | 43.85 | 42.30 | 43.32 | | | | | |
| $Y_2O_3$ | 9.22 | 7.72 | 10.42 | | | | | |
| $ZrO_2$ | 6.28 | 7.86 | 2.00 | | | | | |
| $Ta_2O_5$ | 6.23 | 10.01 | 13.00 | | | | | |

-continued

| Composition | Examples | | |
|---|---|---|---|
| $Nb_2O_5$ | — | — | — |
| BaO | 0.61 | 0.85 | — |
| ZnO | 1.24 | 0.62 | — |
| PbO | — | — | — |
| $TiO_2$ | — | — | — |
| $GeO_2$ | — | — | 17.42 |
| F | 0.50 | 0.48 | 1.08 |
| nd | 1.7728 | 1.7880 | 1.8404 |
| γd | 49.4 | 47.5 | 43.3 |

According to the present invention, optical glass of high refractive index and low dispersion, especially having a refractive index nd in the range of 1.71 to 1.85 and Abbe number νd ranging from 40 to 57 may be produced on an industrial scale to furnish stable products.

It is believed that the advantages and improved results furnish the optical glass compositions of the invention will be apparent from the several preferred embodiments of the invention as hereinbefore described. Various changes and modifications may be made without departing from the spirit and scope of the invention as sought to be defined in the following claims.

We claim:

1. Thorium-free optical glass having a refractive index of 1.71 to 1.85 and Abbe number of 40 to 57 containing oxygen ions and fluorine ions as anions, in which cations in the glass calculated as oxides are present in the following ranges of percentage by weight:

| | |
|---|---|
| $B_2O_3$ | 12–26, |
| $La_2O_3$ | 41–48, |
| $Y_2O_3$ | 8–11, |
| $ZrO_2$ | 1–8, |
| $Ta_2O_5$ | 6–14, |
| $Gd_2O_3$ | 0–12, |
| $Nb_2O_5$ | 0–19, |
| RO | 0–4, |
| PbO | 0–10, |
| $TiO_2$ | 0–8, and |
| $GeO_2$ | 6–23, | where RO is an ingredient or a combination of two or more ingredients of MgO, CaO, SrO, BaO and ZnO, and part of the oxygen ions is substituted for 0.6 to 1.5% by weight of fluorine ions relative to the glass.

2. Optical glass as set forth in claim 1, wherein the cations calculated as oxides are in the following ranges of percentage by weight:

| | |
|---|---|
| $B_2O_3$ | 24.97, |
| $La_2O_3$ | 43.47, |
| $Y_2O_3$ | 9.07, |
| $ZrO_2$ | 6.71, |
| $Ta_2O_5$ | 8.51, |
| $GeO_2$ | 7.21, | and part of the oxygen ions is substituted for 0.67% by weight of fluorine ions relative to the glass.

3. Thorium-free optical glass having a refractive index of approximately 1.77 and Abbe number of approximately 49 containing oxygen ions and fluorine ions as anions, in which cations in the glass calculated as oxides are present in the following ranges of percentage by weight:

| | |
|---|---|
| $B_2O_3$ | 32.57, |
| $La_2O_3$ | 43.85, |
| $Y_2O_3$ | 9.22, |
| $ZrO_2$ | 6.28, |
| $Ta_2O_5$ | 6.23, |
| BaO | 0.61, and |
| ZnO | 1.24, | and part of the oxygen ions is substituted for 0.50% by weight of fluorine ions relative to the glass.

4. Thorium-free optical glass having a refractive index of approximately 1.79 and Abbe number of approximately 48 containing oxygen ions and fluorine ions as anions, in which cations in the glass calculated as oxides are present in the following ranges of percentage by weight:

| | |
|---|---|
| $B_2O_3$ | 30.64, |
| $La_2O_3$ | 42.30, |
| $Y_2O_3$ | 7.72, |
| $ZrO_2$ | 7.86, |
| $Ta_2O_5$ | 10.01, |
| BaO | 0.85, and |
| ZnO | 0.62, | and part of the oxygen ions is substituted for 0.48% by weight of fluorine ions relative to the glass.

5. Thorium-free optical glass having a refractive index of approximately 1.84 and Abbe number of approximately 43 containing oxygen ions and fluorine ions as anions, in which cations in the glass calculated as oxides are present in the following ranges of percentage by weight:

| | |
|---|---|
| $B_2O_3$ | 13.84, |
| $La_2O_3$ | 43.32, |
| $Y_2O_3$ | 10.42, |
| $ZrO_2$ | 2.00, |
| $Ta_2O_5$ | 13.00, and |
| $GeO_2$ | 17.42, | and part of the oxygen ions is substituted for 1.08% by weight of fluorine ions relative to the glass.

* * * * *